(12) United States Patent
Rodriguez Bravo et al.

(10) Patent No.: US 11,875,652 B2
(45) Date of Patent: Jan. 16, 2024

(54) CARD SKIMMING DETECTION

(71) Applicant: KYNDRYL, INC., New York, NY (US)

(72) Inventors: Cesar Augusto Rodriguez Bravo, Alajuela (CR); Mohamed Zouhaier Ramadhane, Azcapotzalco (MX); Desilda Toska, Alajuela (CR)

(73) Assignee: KYNDRYL, INC., New York, NY (US)

( * ) Notice: Subject to any disclaimer, the term of this patent is extended or adjusted under 35 U.S.C. 154(b) by 91 days.

(21) Appl. No.: 17/508,081

(22) Filed: Oct. 22, 2021

(65) Prior Publication Data
US 2023/0129964 A1    Apr. 27, 2023

(51) Int. Cl.
  *G07F 19/00*   (2006.01)
  *G06Q 20/10*   (2012.01)

(52) U.S. Cl.
  CPC ..... *G07F 19/2055* (2013.01); *G06Q 20/1085* (2013.01); *G07F 19/207* (2013.01); *G07F 19/209* (2013.01)

(58) Field of Classification Search
  CPC .............. G07F 19/2055; G07F 19/207; G07F 19/209; G06Q 20/1085
  USPC ............................................. 235/379; 705/43
  See application file for complete search history.

(56) References Cited

U.S. PATENT DOCUMENTS

| | | | |
|---|---|---|---|
| 8,797,144 B2 | 8/2014 | Hinman et al. | |
| 9,000,892 B2 | 4/2015 | Hinman et al. | |
| 10,496,914 B2 | 12/2019 | Scaife et al. | |
| 10,628,638 B1* | 4/2020 | Walters | G07F 7/0893 |
| 11,436,898 B1* | 9/2022 | Oliveira | G07F 19/207 |
| 2013/0146662 A1* | 6/2013 | Randolph | G06K 7/01 235/439 |
| 2013/0299582 A1* | 11/2013 | Ozawa | G06K 7/084 235/440 |

(Continued)

FOREIGN PATENT DOCUMENTS

KR   101586114   1/2016

OTHER PUBLICATIONS

Clark, "Losses incurred during ATM related fraud attacks (incidents) in selected European countries from 2010 to 2019", https://www.statista.com/statistics/419739/fraud-attacks-atm-losses-in-europe/, Jun. 11, 2021, 2 pages.

(Continued)

*Primary Examiner* — Suezu Ellis
(74) *Attorney, Agent, or Firm* — Dan Housley; Andrew M. Calderon; Calderon Safran & Cole P.C (57) ABSTRACT

A computer-implemented method includes: monitoring, by a computing device, outputs of sensors associated with a machine that receives magnetic stripe cards; in response to the monitoring, detecting, by the computing device, the output of at least one of the sensors indicates an event; in response to the detecting the event, determining, by the computing device, a number of the sensors whose output indicates a respective event during a predefined time period; selecting, by the computing device, a security action from a plurality of predefined security actions based on the determined number of the sensors whose output indicates a respective event during the predefined time period; and initiating, by the computing device, the security action.

20 Claims, 5 Drawing Sheets

(56) References Cited

U.S. PATENT DOCUMENTS

| | | | |
|---|---|---|---|
| 2014/0151449 A1* | 6/2014 | Jenkins | G07F 19/2055 235/379 |
| 2015/0302707 A1 | 10/2015 | Wiesinger et al. | |
| 2017/0061167 A1* | 3/2017 | McNicoll | G06K 13/0875 |
| 2017/0372144 A1 | 12/2017 | Kurita et al. | |
| 2018/0046948 A1 | 2/2018 | Ray et al. | |

OTHER PUBLICATIONS

Anonymous, "RGB Color Sensor with IR filter and White LED—TCS34725", https://www.adafruit.com/product/1334, accessed Oct. 27, 2021, 8 pages.

Patel, "What is Object Detection?", https://medium.com/ml-research-lab/what-is-object-detection-51f9d872ece7, Jun. 11, 2020, 7 pages.

Mobility Insider, What Is GestureRecognition?, https://www.aptiv.com/en/insights/article/what-is-gesture-recognition, Apr. 30, 2021, 4 pages.

Boesch, "Object Detection in 2021: The Definitive Guide", https://viso.ai/deep-learning/object-detection/, Jul. 9, 2021, 19 pages.

Anonymous, "Hand Tracking and Gesture Recognition Using AI: Applicationsand Challenges", https://intellias.com/hand-tracking-and-gesture-recognition-using-ai-applications-and-challenges/, accessed Oct. 10, 2021, 11 pages.

Bazarevsky et al. "On-Device, Real-Time Hand Tracking with MediaPipe", https://ai.googleblog.com/2019/08/on-device-real-time-hand-tracking-with.html, Aug. 19, 2019, 7 pages.

Anonymous, "Gesture recognition", https://en.wikipedia.org/wiki/Gesture_recognition, accessed Oct. 10, 2021, 12 pages.

Anonymous, "Finger tracking", https://en.wikipedia.org/wiki/Finger_tracking, accessed Oct. 10, 2021, 7 pages.

Dickson, "An introduction to object detection with deeplearning", https://bdtechtalks.com/2021/06/21/object-detection-deep-learning/, Jun. 21, 2021, 9 pages.

Mantecón, "A real-time gesture recognition system usingnear-infrared imagery", https://www.ncbi.nlm.nih.gov/pmc/articles/PMC6776328/, Oct. 3, 2019, 36 pages.

Krebs, "All About Skimmers", https://krebsonsecurity.com/all-about-skimmers/, accessed Oct. 27, 2021, 17 pages.

Lewis, "Computer Vision & AI Safeguard ATMs", https://www.insight.tech/content/computer-vision-ai-safeguard-atms, Mar. 5, 2020, 5 pages.

Rattanapitak, "Vision-Based System for Automatic Detection of Suspicious Objects on ATM", Aug. 25, 2015, 12 pages.

"Anti-Skim Protection DIP and Motorized Card Readers", https://www.cumminsallison.com/us/en/products/atm/anti-skim, accessed Aug. 2, 2021, 3 pages.

* cited by examiner

CARD SKIMMING DETECTION

BACKGROUND

Aspects of the present invention relate generally to electronic device security and, more particularly, to card skimming detection using plural different sensors.

An automated teller machine (ATM) is a financial automation device by which account holders may access their account to perform transactions, such as deposit, withdraw, and transfer funds. Account holders typically insert their card into an ATM by inserting a magnetics stripe card (e.g., a credit card or an ATM card) into the ATM.

SUMMARY

In a first aspect of the invention, there is a computer-implemented method including: monitoring, by a computing device, outputs of sensors associated with a machine that receives magnetic stripe cards; in response to the monitoring, detecting, by the computing device, the output of at least one of the sensors indicates an event; in response to the detecting the output of at least one of the sensors indicates an event, determining, by the computing device, a number of the sensors whose output indicates a respective event during a predefined time period; selecting, by the computing device, a security action from a plurality of predefined security actions based on the determined number of the sensors whose output indicates a respective event during the predefined time period; and initiating, by the computing device, the security action.

In another aspect of the invention, there is a computer program product including one or more computer readable storage media having program instructions collectively stored on the one or more computer readable storage media. The program instructions are executable to: monitor outputs of sensors associated with a machine that receives magnetic stripe cards; in response to the monitoring, detect the output of at least one of the sensors indicates an event; in response to the detecting, determine a number of the sensors whose output indicates a respective event during a predefined time period; select a security action from a plurality of predefined security actions based on the determined number of the sensors whose output indicates a respective event during the predefined time period; and initiate the security action.

In another aspect of the invention, there is system including a processor, a computer readable memory, one or more computer readable storage media, and program instructions collectively stored on the one or more computer readable storage media. The program instructions are executable to: monitor outputs of sensors associated with a machine that receives magnetic stripe cards; in response to the monitoring, detect the output of at least one of the sensors indicates an event; in response to the detecting, determine a number of the sensors whose output indicates a respective event during a predefined time period; select a security action from a plurality of predefined security actions based on the determined number of the sensors whose output indicates a respective event during the predefined time period; and initiate the security action.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to electronic device security and, more particularly, to card skimming detection using plural different sensors. Credit card skimming is a type of credit card theft where a small device is used to capture credit card information in an otherwise legitimate credit or debit card transaction. When a credit or debit card is swiped through a skimmer, the device captures and stores all the details stored in the card's magnetic stripe. The stripe contains the credit card number, expiration date, and the credit card holder's full name. Data obtained in this manner may be used to make fraudulent charges either online or with a counterfeit credit card. Credit card skimmers are often placed over the card swipe mechanism on ATMs, but the skimmers can be placed over almost any type of credit card reader. With ATMs, a small camera may be pointed at the skimmer to record a user's personal identification number (PIN), which provides all the information needed to make fake cards and withdraw cash from the cardholder's account. Therefore, card skimmers represent a security threat to electronic accounts.

Aspects of the invention address this threat by utilizing plural different types of sensors to detect abnormal events at an ATM, and to correlate the outputs of the sensors to different security actions. Implementations of the invention monitor the respective outputs of the different sensors and determine that the output of one of the sensors indicates an event based on any one of: determining based on the output of a gesture sensor that a person at a machine is not inserting a card; determining based on the output of a camera sensor that an object in the person's hand is not a card; and determining based on the output of a color recognition sensor that an item is placed over a portion of the machine for more than a predefined amount of time Implementations of the invention thus provide an improvement in the technology of machines that receive magnetic stripe cards (such as ATMs) by providing a technical solution to the technical problem of security threats posed by card skimming devices. In embodiments, the technical solution includes utilizing plural different types of sensors to detect abnormal events at the machine (e.g., ATM) and to initiate different security actions based on different combinations of outputs of the sensors.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
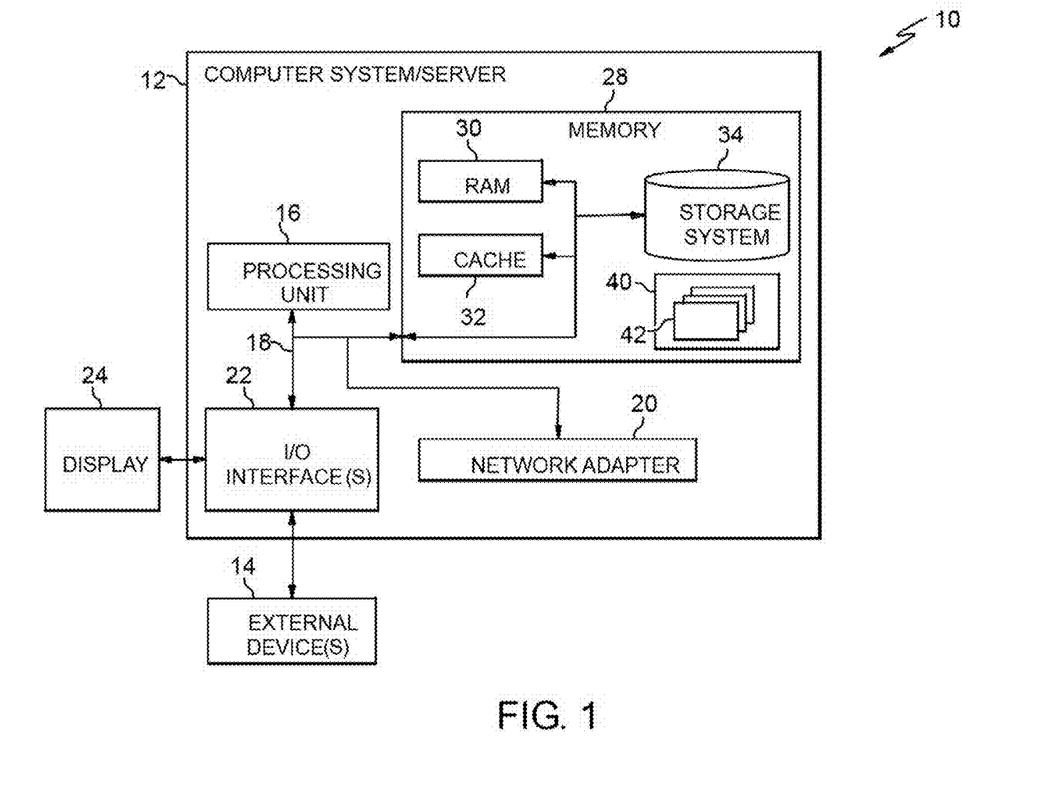
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
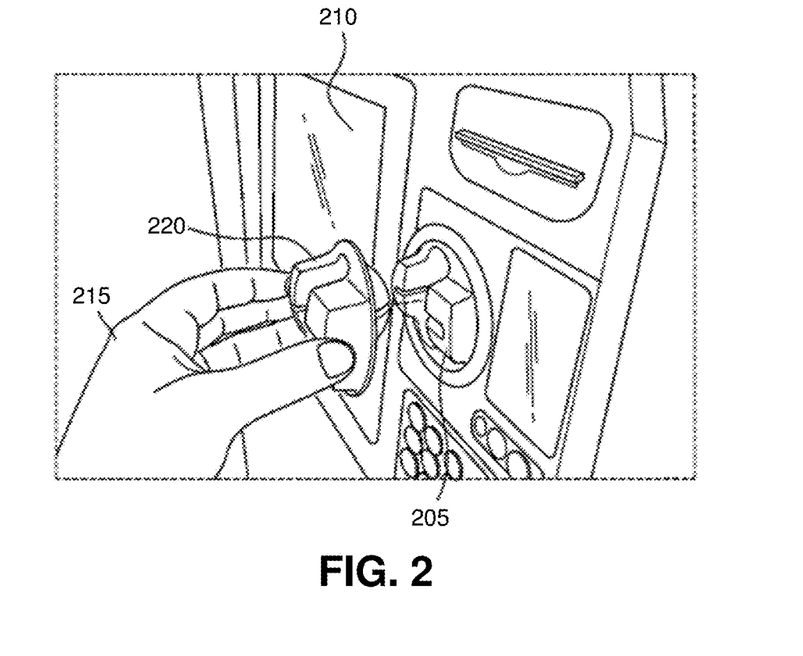
FIG. 2 illustrates an example of a card insertion portion of a machine that receives magnetic stripe cards in accordance with aspects of the invention.

FIG. 2 illustrates an example of a card insertion portion 205 of a machine 210 that receives magnetic stripe cards, such as an automated teller machine (ATM). An ATM is a financial automation device by which account holders may access their account to perform transactions, such as deposit, withdraw, and transfer funds. In FIG. 2, a user's hand 215 holds a card skimming device 220 in the act of placing the card skimming device 220 on the card insertion portion 205 of the machine 210. The card skimming device 220 is an unauthorized attachment. As illustrated in FIG. 2, the card skimming device 220 has a shape that is very similar to the shape of a card insertion portion (bezel) 205 provided in a main body of the machine 210, and has a structure to be mounted over the card insertion portion 205. The card skimming device 220 is placed on and covering the card insertion portion 205 in an effort to trick unsuspecting users into inserting their magnetic stripe card (e.g., credit card or ATM card) into the card skimming device 220. The card skimming device 220 includes electronics that read and store information from the magnetic stripe of a card inserted into the device. Information obtained in this manner can be used to gain unauthorized access to the financial account of the owner of the card. Therefore, card skimming devices represent a security threat to electronic accounts.

Figure 3:
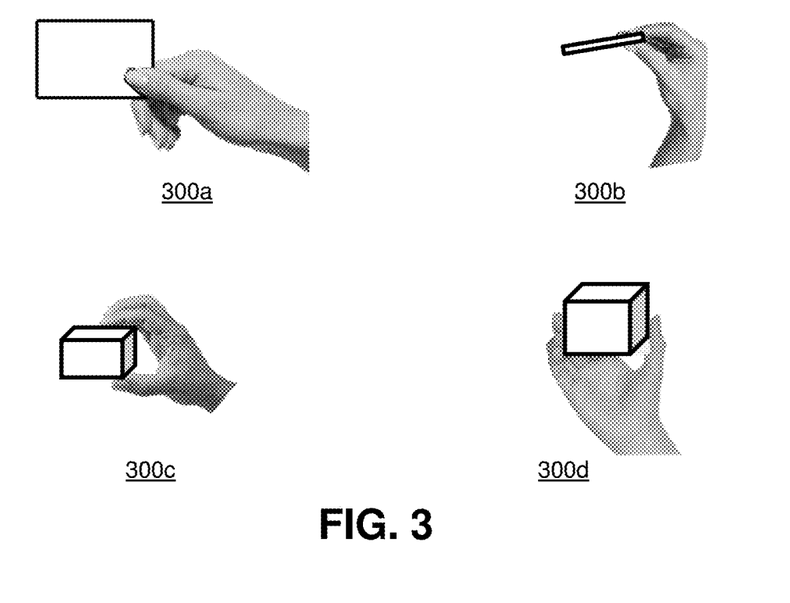
FIG. 3 shows examples of hand shapes in accordance with aspects of the invention.

As can be seen in FIGS. 2 and 3, the card skimming device 220 has a shape that is very different from the shape of a magnetic stripe card such as a credit card or ATM card.

As a result of this shape, the shape of the user's hand 215 when holding the card skimming device 220 is different than the shape of a hand holding a magnetic stripe card.

FIG. 3 shows examples of hand shapes 300*a*, 300*b* when holding a magnetic stripe card, and examples of hand shapes 300*c*, 300*d* when holding an object that is not a magnetic stripe card. The hand shapes 300*c*, 300*d* are similar to that shown in FIG. 2 in which the hand 215 is holding a card skimming device 220, and are not similar to shapes 300*a*, 300*b* in which the hand is holding a magnetic stripe card.

Implementations of the invention recognize that the different hand shapes (e.g., 300*a*, 300*b* compared to 300*c*, 300*d*) result in different gestures when a user is placing a card in the card insertion portion 205 compared to when a user is placing a card skimming device 220 on the card insertion portion 205. Based on this, implementations of the invention utilize a gesture sensor to detect whether a user is making a gesture that is consistent with placing a card in a card insertion portion.

Implementations of the invention also utilize computer vision techniques with another sensor (e.g., a camera) to determine whether a user is holding a card or something other than a card. In embodiments, the system uses image segmentation to differentiate between the user's hand and the object in the hand, and the system uses object detection and classification to determine whether the object in the hand is a card.

Implementation of the invention additionally utilize a sensor at the card insertion portion 205 to determine when something is covering the card insertion portion 205. In embodiments, the system uses a color recognition sensor to determine the presence of an object cover the card insertion portion 205.

According to aspects of the invention, using the three different types of sensors and the three different determinations permits the system to be tailored to different risk appetites of the organization that owns, operates, or controls the machine 210. Risk appetite is the level of risk that the organization that owns, operates, or controls the machine 210 is prepared to accept before taking action to reduce the risk. On the one hand, a relatively lower risk appetite means that the organization will tolerate less risk before taking action to reduce the risk. On the other hand, a relatively higher risk appetite means that the organization will tolerate more risk before taking action to reduce the risk. In the context of aspects of the invention, an organization with a lower risk appetite for the machine 210 may initiate a security action when only one of the three sensors indicates an abnormal condition, an organization with a medium risk appetite for the machine 210 may initiate a security action when only two of the three sensors indicate an abnormal condition, and an organization with a higher risk appetite for the machine 210 may initiate a security action only when all three of the three sensors indicate an abnormal condition. In another context, an organization may define different security actions to be performed on a single machine 210 based on different number of sensors that indicate an abnormal condition at any given time.

Figure 4:
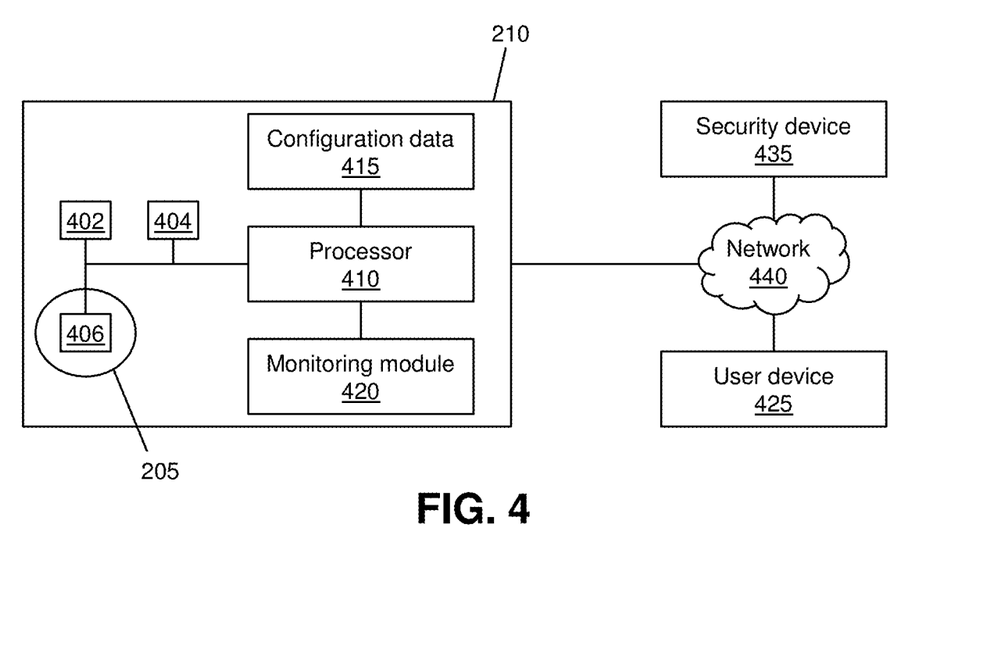
FIG. 4 shows a block diagram of an exemplary system in accordance with aspects of the invention.

FIG. 4 shows a block diagram of an exemplary system in accordance with aspects of the invention. As shown in FIG. 4, the system includes a machine 210 that includes a card insertion portion 205 where a user inserts a magnetic stripe card (e.g., a credit card or an ATM card) to initiate a transaction with the machine 210. In accordance with aspects of the invention, the machine 210 includes plural different sensors that are used to determine when a credit card skimming device is attached to the machine 210. In embodiments, the sensors include a gesture sensor 402, a camera 404, and a color recognition sensor 406.

The machine 210 may be an ATM or another type of machine that receives magnetic stripe cards. For example, the machine 210 may be an automated gasoline terminal that includes a card insertion portion 205 where a user inserts a magnetic stripe card to initiate a transaction.

In embodiments, the machine 210 includes a processor 410, configuration data 415, and a monitoring module 420. The processor 410 is a processing unit such as processor 16 of FIG. 1. The configuration data 415 is stored in memory such as storage system 34 of FIG. 1. The monitoring module 420 may comprise one or more program modules 42 of FIG. 1. The sensors 402, 404, 406 may be connected to the processor 410 by an interconnect such as bus 18 of FIG. 1. In this manner, the processor 410 may receive the respective outputs of the individual sensors 402, 404, 406 and execute the monitoring module 420 using the outputs to perform one or more functions described herein, such as the functions described with respect to FIGS. 6 and 7.

In embodiments, the machine 210 is connected to a network 440 through which the machine 210 can communicate with other devices such as a user device 425 and an external security device 435. In this manner, in response to determining a security action based on the output of one or more of the sensors 402, 404, 406, the machine 210 may initiate the security action using communications over the network 440.

With continued reference to FIG. 4, in implementations the gesture sensor 402 is connected to or integrated with the machine 210 and points outward toward an area in close proximity to the card insertion portion 205, so that the gesture sensor 402 detects hand gestures that occur near the card insertion portion 205. In embodiments, the gesture sensor 402 is an infrared (IR) sensor that includes an IR emitter and plural directional photodiodes that sense reflected IR energy from the emitter. Using plural directional photodiodes to sense reflected IR energy permits measuring changes in IR light reflectance at different locations over time and correlating those changes to gestures. In embodiments, the system uses a first model (e.g., a machine learning model) that is trained using training data sets, each of the training data sets comprising historic gesture sensor data (e.g., measured changes in IR light reflectance at the locations over time), and each of the training data sets being labeled as positive (e.g., inserting a card) or negative (i.e., not inserting a card). Training in this manner creates a model that receives gesture sensor data as an input and that, based on the input, outputs a determination of whether the gesture sensor data corresponds to inserting a card or not inserting a card. In this manner, the system may use the model with real time data from the gesture sensor 402 to determine whether a person at the machine 210 is making a gesture that corresponds to inserting a card or making a gesture that corresponds to not inserting a card. In embodiments, when the system determines that a person is making a gesture that is not inserting a card, the systems equates this to an abnormal event at the machine 210. In embodiments, because the gesture sensor 402 is focused on the area immediately in front of the card insertion portion 205, any determination of a gesture that is not inserting a card is automatically deemed as being near the card insertion portion 205.

With continued reference to FIG. 4, in implementations the camera 404 is connected to or integrated with the machine 210 and points outward toward an area in close proximity to the card insertion portion 205, so that the camera 404 captures video data of the area near the card insertion portion 205. In embodiments, the camera 404 is an optical video camera whose video data can be analyzed using computer vision techniques such as image segmentation and object detection and classification. In embodiments, the system analyzes the video data using image segmentation to differentiate between a user's hand and an object in the hand, and using object detection and classification to determine whether the object in the hand is a card or something other than a card. In embodiments, the system uses a second model (e.g., a machine learning model) that is trained using training data sets, each of the training data sets comprising historic camera data, and each of the training data sets being labeled as positive (e.g., an object in a hand is a card) or negative (i.e., an object in a hand is not a card). In particular embodiments, the model may be a convolutional neural network. Training in this manner creates a model that receives camera data as an input and that, based on the input, outputs a determination of whether a user is holding a card or something other than a card. In this manner, the system may use the model with real time data from the camera 404 to determine whether a person at the machine 210 is holding a card or something other than a card. In embodiments, when the system determines that a person is holding something that is not a card near the card insertion portion 205, the systems equates this to an abnormal event at the machine 210. In embodiments, because the camera 404 is focused on the area immediately in front of the card insertion portion 205, any determination of a hand holding something that is not a card is automatically deemed as being near the card insertion portion 205.

With continued reference to FIG. 4, in implementations the color recognition sensor 406 is connected to or integrated with the card insertion portion 205 of the machine 210 so that the output of the color recognition sensor 406 can be used to determine when an object is placed over the card insertion portion 205. In embodiments, the color recognition sensor 406 is a red-green-blue (RGB) sensor that has an array of photodiodes, with different subsets of the photodiodes having different colors filters (e.g., red, green, and blue). In embodiments, the color recognition sensor 406 has a range of about one to two inches and outputs a value having three components (each between 0 and 255), the value representing the color of an object within this range. When nothing is placed over the card insertion portion 205 in this range, the color recognition sensor 406 outputs a baseline value, e.g., (0, 0, 0). When an object is placed over the card insertion portion 205 in this range, the color recognition sensor 406 outputs something other than the baseline value, e.g., something other than (0, 0, 0). For example, a card skimming device 220 that is composed of semi-transparent green plastic and that is placed over the card insertion portion 205 (e.g., as depicted in FIG. 2) would cause the color recognition sensor 406 to output a value of (0, 255, 0), which differs from the baseline value of (0, 0, 0). In another example, a card skimming device 220 that is opaque and that is placed over the card insertion portion 205 (e.g., as depicted in FIG. 2) would cause the color recognition sensor 406 to output a value of (255, 255, 255), which differs from the baseline value of (0, 0, 0). In embodiments, the system is configured to determine when the output of the color recognition sensor 406 deviates from the baseline value for more than a predefined amount of time, and to equate this occurrence to an abnormal event at the machine 210. In embodiments, the predefined amount of time is configurable and may be set at values such as three minutes, five minutes, ten minutes, etc., to eliminate false positives where a user temporarily places something like a bag or purse on the machine 210 while conducting a legitimate transaction.

Still referring to FIG. 4, in implementations the monitoring module 420 continuously monitors the respective outputs of the sensors 402, 404, 406 for the occurrence of an event. In embodiments, an event is any one of: determining based on the output of the gesture sensor 402 that a person at the machine 210 is not inserting a card; determining based on the output of the camera 404 that an object in the person's hand is not a card; and determining based on the output of the color recognition sensor 406 that an item is placed over a portion of the machine for more than a predefined amount of time. In embodiments, based on detecting one of these events, the monitoring module 420 starts a timer and continues to monitor the respective outputs of the sensors 402, 404, 406 for the occurrence of events. In embodiments, the monitoring module 420 waits a predefined time period from a time of starting the timer, using the timer to measure until the predefined time period has occurred. In embodiments, at the end of the predefined time period the monitoring module 420 determines how many of the sensors 402, 404, 406 generated output that indicated an event during the predefined time period. In embodiments, based on this number of the sensors 402, 404, 406 whose output indicated a respective event during the predefined time period, the monitoring module 420 selects a security action from a plurality of predefined security actions, and initiates the security action. In embodiments, the predefined security actions include: sending an alert message to a user device 425; causing the machine 210 to emit an alert that is audio and/or visual; activating an external security device 435, e.g., camera that is external to and pointed at the machine 210; and disabling the machine 210.

For example, after detecting that the output of the gesture sensor 402 indicates an event (e.g., a gesture that is not consistent with a gesture of inserting a card), the monitoring module 420 starts a timer and continues to monitor the sensors 404 and 406 to determine if their output indicates an event during a predefined time period measured using the timer. In this example, the monitoring module 420 determines that the output of the color recognition sensor 406 also indicated an event during the predefined time period, and that the output of the camera 404 did not indicate an event during the predefined time period. In this example, the number of sensors that indicated a respective event during the predefined time period is two. In this example, the monitoring module 420 selects one or more of the plurality of predefined security actions based on two sensors indicating a respective event during the predefined time period.

In embodiments, the configuration data 415 stores data that defines which one or more security actions to initiate based on the number of sensors that indicates a respective event. In embodiments, this data that defines which one or more security actions to initiate based on the number of sensors is configurable based on a risk appetite associated with the machine 210. For example, an owner of one machine 210 might define that data such that: for one sensor indicating an event, initiate sending an alert message to a user device 425; for two sensors indicating an event, initiate sending an alert message to a user device 425 and initiate activating a camera that is external to and pointed at the machine 210; and for three sensors indicating an event, initiate sending an alert message to a user device 425 and initiate disabling the machine 210. In another example, the owner of another machine 210 might define the data such that: for one sensor indicating an event, initiate sending an alert message to a user device 425; for two sensors indicating an event, initiate sending an alert message to a user device 425 and initiate causing the machine 210 to emit an alert that is audio and/or visual; and for three sensors indicating an event, initiate sending an alert message to a user device 425, initiate causing the machine 210 to emit an alert that is audio and/or visual, and initiate disabling the machine 210. In this manner, the system permits the owner or operator of the machine 210 to tailor which security actions to initiate based on the number of sensors that indicate an event during the predefined time period. Additionally, the predefined time period may also be a configurable value that is stored in the configuration data 415 and that may be defined by the owner or operator of the machine 210 based on a risk appetite associated with the machine 210.

In accordance with further aspects of the invention, the monitoring module 420 may be configured to select one or more of the plurality of predefined security actions based on which of the sensors indicated a respective event during the predefined time period. For example, the monitoring module 420 and the configuration data 415 may be configured such that the system selects and initiates: a first (e.g., low priority) security action when only the gesture sensor 402 and/or the camera 404 indicate an event; a second (e.g., medium priority) security action when the color recognition sensor 406 and one of the gesture sensor 402 and the camera 404 indicate an event; and a third (e.g., high priority) security action when all the sensors 402, 404, 406 indicate an event.

Figure 5:
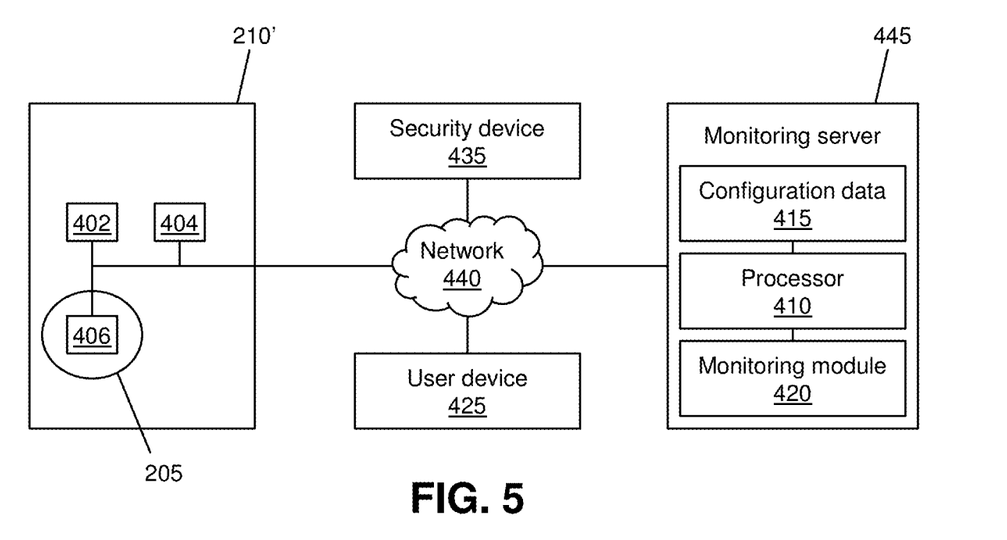
FIG. 5 shows a block diagram of another exemplary system in accordance with aspects of the invention.

FIG. 5 shows a block diagram of another exemplary system in accordance with aspects of the invention. The system shown in FIG. 5 includes elements similar to those shown in the system in FIG. 4. However, in the system in FIG. 4 the processor 410, configuration data 415, and monitoring module 420 are included in the machine 210, whereas in the system in FIG. 5 the processor 410, configuration data 415, and monitoring module 420 are included in a monitoring server 445 that is remote from the machine 210' and is connected to the machine 210' via the network 440. The monitoring server 445 is a computing device and may include one or more elements of the computer system 12 of FIG. 1.

In the system shown in FIG. 4, the machine 210 may include additional or fewer modules than those shown. Similarly, in the system shown in FIG. 5, the monitoring server 445 may include additional or fewer modules than those shown. In both systems, the functions performed by separate modules may be integrated into a single module. Additionally, or alternatively, the functions performed a single module may be implemented as multiple modules. Moreover, the quantity of devices and/or networks in the environment is not limited to what is shown in FIGS. 4 and 5. In practice, the environment may include additional devices and/or networks; fewer devices and/or networks; different devices and/or networks; or differently arranged devices and/or networks than illustrated in FIGS. 4 and 5.

Figure 6:
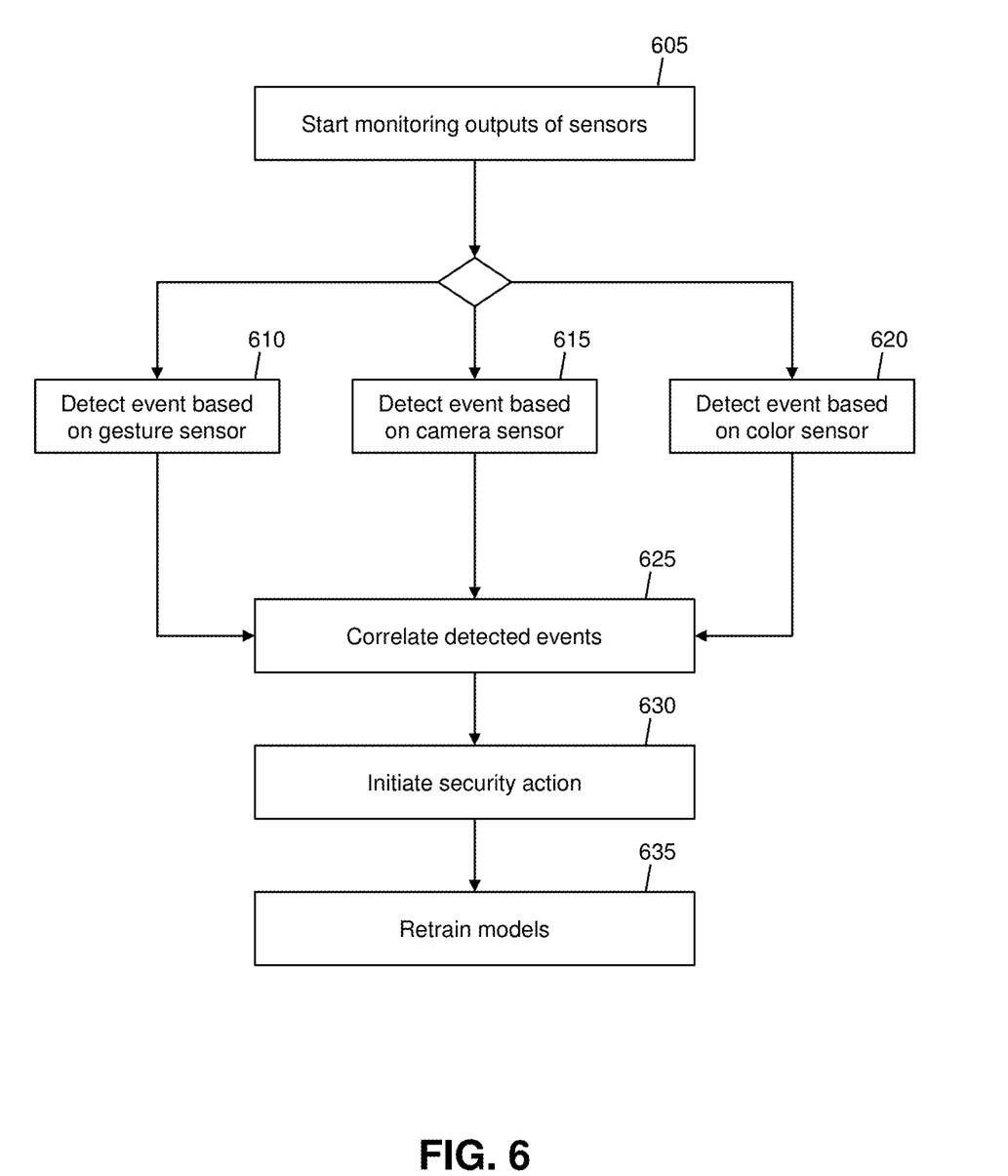
FIG. 6 shows a flowchart of an exemplary method in accordance with aspects of the invention.

FIG. 6 shows a flowchart of an exemplary method in accordance with aspects of the present invention. Steps of the method may be carried out in the environments of FIGS. 4 and 5 and are described with reference to elements depicted in FIGS. 4 and 5.

At step 605, the system (e.g., the monitoring module 420) starts monitoring the outputs of the sensors 402, 404, 406. At step 610, the system (e.g., the monitoring module 420) detects an event based on the output of the gesture sensor 402. At step 615, the system (e.g., the monitoring module 420) detects an event based on the output of the camera 404. At step 620, the system (e.g., the monitoring module 420) detects an event based on the output of the color recognition sensor. At step 625, the system (e.g., the monitoring module 420) correlates the detected events. At step 630, the system (e.g., the monitoring module 420) initiates a security action. At step 635, the system (e.g., the monitoring module 420) retrains the models. In embodiments, the system retrains the first model (used with the gesture sensor) and/or the second model (used with the camera) using the data that was detected at steps 610 and/or 615.

Figure 7:
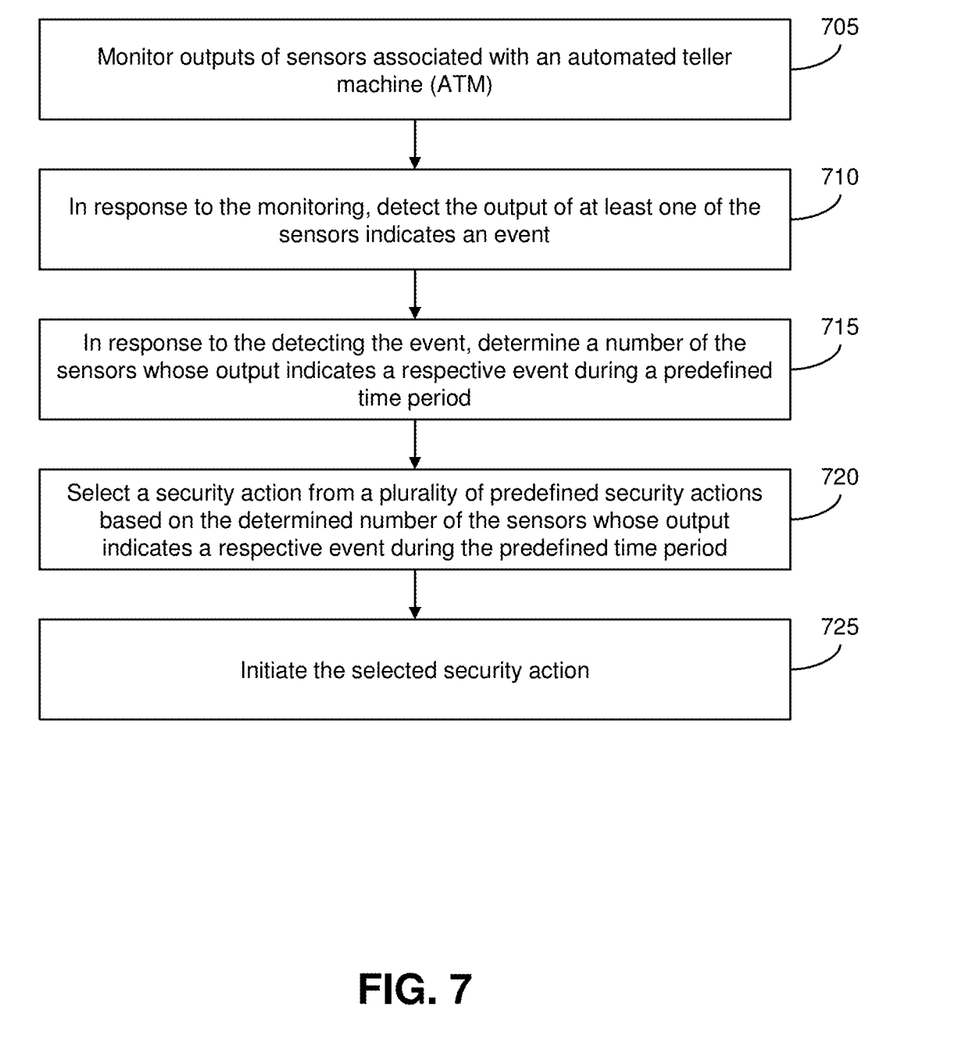
FIG. 7 shows a flowchart of another exemplary method in accordance with aspects of the invention.

FIG. 7 shows a flowchart of another exemplary method in accordance with aspects of the present invention. Steps of the method may be carried out in the environments of FIGS. 4 and 5 and are described with reference to elements depicted in FIGS. 4 and 5.

At step 705, the system monitors outputs of sensors associated with a machine that receives magnetic stripe cards. In embodiments, and as described with respect to FIG. 4, the monitoring module 420 monitors the respective outputs of the sensors 402, 404, 406 associated with machine 210.

At step 710, in response to the monitoring of step 705, the system detects the output of at least one of the sensors indicates an event. In embodiments, and as described with respect to FIG. 4, the monitoring module 420 determines that the output of one of the sensors 402, 404, 406 indicates an event based on any one of: determining based on the output of the gesture sensor 402 that a person at the machine 210 is not inserting a card; determining based on the output of the camera 404 that an object in the person's hand is not a card; and determining based on the output of the color recognition sensor 406 that an item is placed over a portion of the machine for more than a predefined amount of time.

At step 715, in response to the detecting the event at step 710, the system determines a number of the sensors whose output indicates a respective event during a predefined time period. In embodiments, and as described with respect to FIG. 4, the monitoring module 420 starts a timer and determines the number sensors 402, 404, 406 whose output indicates a respective event during a predefined time period measured using the timer.

At step 720, the system selects a security action from a plurality of predefined security actions based on the determined number of the sensors from step 715. In embodiments, and as described with respect to FIG. 4, the monitoring module 420 accesses the configuration data 415 and selects one or more security actions that are defined for this particular machine for the determined number of sensors.

At step 725, the system initiates the selected security action. In embodiments, and as described with respect to FIG. 4, the monitoring module 420 performs one or more of: sends an alert message to a user device 425; cause the machine 210 to emit an alert that is audio and/or visual; sends instruction to an external security device 435, e.g., to activate camera that is external to and pointed at the machine 210; and disables the machine 210.

In accordance with further aspects of the invention there is a method that includes monitoring and analyzing phases. In the monitoring phase, the system starts monitoring the outputs of the sensors. In embodiments, during this phase the system detects gesture activity. For example, when hands are detected by the gesture sensor, the system uses the pretrained model to determine if this activity is a normal usage of the ATM, or if it is a suspicious one. In embodiments, during this phase the system uses visual recognition. For example, the system uses the camera to monitor the ATM activity. In embodiments, during this phase the system may use a trained artificial intelligence (AI) model to identify the scenario (intents of the users) at the ATM. In embodiments, during the analysis phase the system correlates events, reports any anomaly, collects data, and trains the model. For example, the system may correlate the event from the gesture and the visual modules, and it check if the ATM is in use or not, and if in use at what stage of the usage it is (inserting card, introducing pin, etc.). By correlating those events, the system may calculate the probability of the nature of the usage (e.g., legitimate or suspicious). In this example, if the system detects a possible suspicious activity, it will report the activity and temporary disable the ATM to protect the users. In this example, after the report a human activity is implemented to review all the data and give feedback to the AI so that the model can be trained. In this example, after every interaction (legitimate or suspicious) the system store all the data to be used for training the model. The model may be trained in two ways, automatic and manual. In an example of automatic training, when the system reports a normal usage, that usage is confirmed with the status of the ATM, and every interaction is used to further train the model. In an example of manual training, this can happen with either legitimate or suspicious. In this example, a human user reviews the data and provides feedback to the AI (either confirming the suspicious activity or marking the incident as a false positive). In this example, when an incident is reported that have not been detected by the AI, a human user manually trains the AI model on the missed suspicious activity.

In view of the forgoing description, it should be understood that aspects of the invention provide for a computer-implemented process for managing security of an automated teller machine (ATM), the computer-implemented process comprising: in response to monitoring the ATM using a plurality of sensors for presence of a user, detecting activity; recording the activity including detected gesture activity and a visual scenario identified using at least one trained artificial intelligence model; correlating events from the detected gesture activity and a visual scenario identified to create correlated event information; calculating a probability of normal usage of the ATM using the correlated event information; in response to a determination the probability of normal usage is less than a predetermined threshold, initiating actions including temporary disabling the ATM and notifying ATM support; in response to a determination the probability of normal usage is greater than a predetermined threshold, enabling transactions on the ATM and notifying ATM support; and updating the least one trained artificial intelligence model using activity recorded.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
monitoring, by a computing device, outputs of sensors associated with a machine that receives magnetic stripe cards;
in response to the monitoring, detecting, by the computing device, the output of at least one of the sensors indicates an event;
in response to the detecting the output of at least one of the sensors indicates an event, determining, by the computing device, a number of the sensors whose output indicates a respective event during a predefined time period;
selecting, by the computing device, a security action from a plurality of predefined security actions based on the determined number of the sensors whose output indicates a respective event during the predefined time period; and
initiating, by the computing device, the security action.

2. The method of claim 1, wherein the sensors include:
a gesture sensor;
a camera; and
a color recognition sensor.

3. The method of claim 2, further comprising:
determining, using the output of the gesture sensor, a person at the machine is one of inserting a card and not inserting a card;
determining, using the output of the camera, an object in the person's hand is one of a card and not a card; and
determining, using the output of the color recognition sensor, whether an item is placed over a portion of the machine.

4. The method of claim 3, wherein:
the gesture sensor is an infrared sensor, and the determining the person at the machine is one of inserting a card and not inserting a card comprises inputting the output of the gesture sensor into a first trained model;
the camera is an optical camera, and the determining the object in the person's hand is one of a card and not a card comprises analyzing the output of the camera using image segmentation and object detection and classification; and
the color recognition sensor is a red-green-blue (RGB) sensor.

5. The method of claim 3, wherein:
the computing device determines the output of the gesture sensor indicates an event in response to determining the person at the machine is not inserting a card;

the computing device determines the output of the camera indicates an event in response to determining the object in the person's hand is not a card; and the computing device determines the output of the color recognition sensor indicates an event in response to determining an item is placed over a portion of the machine for more than a predefined amount of time.

6. The method of claim 1, wherein the plurality of predefined security actions include:
sending an alert message to a user device;
causing the machine to emit an alert that is audio and/or visual;
activating a camera that is external to and pointed at the machine; and
disabling the machine.

7. The method of claim 6, wherein which ones of the plurality of predefined security actions to select, based on the determined number of sensors, is configurable based on a risk appetite associated with the machine.

8. The method of claim 1, further comprising:
starting a timer based on the detecting the output of at least one of the sensors indicates an event; and
measuring the predefined time period using the timer.

9. The method of claim 8, wherein the predefined time period is configurable based on a risk appetite associated with the machine.

10. The method of claim 1, wherein the selecting the security action is further based on which particular ones of the sensors whose output indicates a respective event during the predefined time period.

11. A computer program product comprising one or more computer readable storage media having program instructions collectively stored on the one or more computer readable storage media, the program instructions executable to:
monitor outputs of sensors associated with a machine that receives magnetic stripe cards;
in response to the monitoring, detect the output of at least one of the sensors indicates an event;
in response to the detecting, determine a number of the sensors whose output indicates a respective event during a predefined time period;
select a security action from a plurality of predefined security actions based on the determined number of the sensors whose output indicates a respective event during the predefined time period; and
initiate the security action.

12. The computer program product of claim 11, wherein the sensors include:
a gesture sensor;
a camera; and
a color recognition sensor.

13. The computer program product of claim 12, wherein the program instructions are executable to:
determine, using the output of the gesture sensor, a person at the machine is one of inserting a card and not inserting a card;
determine, using the output of the camera, an object in the person's hand is one of a card and not a card; and
determine, using the output of the color recognition sensor, whether an item is placed over a portion of the machine.

14. The computer program product of claim 13, wherein:
the gesture sensor is an infrared sensor, and the determining the person at the machine is one of inserting a card and not inserting a card comprises inputting the output of the gesture sensor into a first trained model;
the camera is an optical camera, and the determining the object in the person's hand is one of a card and not a card comprises analyzing the output of the camera using image segmentation and object detection and classification; and
the color recognition sensor is a red-green-blue (RGB) sensor.

15. The computer program product of claim 13, wherein:
the computing device determines the output of the gesture sensor indicates an event in response to determining the person at the machine is not inserting a card;
the computing device determines the output of the camera indicates an event in response to determining the object in the person's hand is not a card; and
the computing device determines the output of the color recognition sensor indicates an event in response to determining an item is placed over a portion of the machine for more than a predefined amount of time.

16. A system comprising:
a processor, a computer readable memory, one or more computer readable storage media, and program instructions collectively stored on the one or more computer readable storage media, the program instructions executable to:
monitor outputs of sensors associated with a machine that receives magnetic stripe cards;
in response to the monitoring, detect the output of at least one of the sensors indicates an event;
in response to the detecting, determine a number of the sensors whose output indicates a respective event during a predefined time period;
select a security action from a plurality of predefined security actions based on the determined number of the sensors whose output indicates a respective event during the predefined time period; and
initiate the security action.

17. The system of claim 16, wherein the plurality of predefined security actions include:
sending an alert message to a user device;
causing the machine to emit an alert that is audio and/or visual;
activating a camera that is external to and pointed at the machine; and
disabling the machine.

18. The system of claim 17, wherein which ones of the plurality of predefined security actions to select, based on the determined number of sensors, is configurable based on a risk appetite associated with the machine.

19. The system of claim 16, wherein the program instructions are executable to:
start a timer based on the detecting the output of at least one of the sensors indicates an event; and
measure the predefined time period using the timer, wherein the predefined time period is configurable based on a risk appetite associated with the machine.

20. The system of claim 16, wherein the selecting the security action is further based on which particular ones of the sensors whose output indicates a respective event during the predefined time period.

* * * * *